United States Patent [19]

Jaroche

[11] 4,225,108
[45] Sep. 30, 1980

[54] DISPLAY HANGER AND METHOD OF INSTALLATION THEREFOR

[75] Inventor: Ralph J. Jaroche, Wolverine, Mich.

[73] Assignee: The Stroh Brewery Company, Detroit, Mich.

[21] Appl. No.: 7,292

[22] Filed: Jan. 29, 1979

[51] Int. Cl.³ ............................................. F16M 13/00
[52] U.S. Cl. .................... 248/544; 248/340; 248/467; 248/489; 294/19 R
[58] Field of Search .............. 248/317, 320, 339, 340, 248/359, 360, 467, 489, 544, 546; 294/19 R, 85

[56] References Cited

U.S. PATENT DOCUMENTS

| 703,178 | 6/1902 | Bye | 294/19 R |
|---|---|---|---|
| 860,762 | 7/1907 | McGrady | 248/544 |
| 1,197,139 | 9/1916 | Mastin | 294/19 R |
| 1,548,128 | 8/1925 | Fisher | 248/544 X |
| 1,804,420 | 5/1931 | Kelley | 248/317 |
| 3,008,735 | 10/1961 | Havener | 248/228 |
| 3,327,376 | 6/1967 | Freeman | 294/85 X |
| 3,350,045 | 10/1967 | Mayers | 248/467 X |
| 3,561,718 | 2/1971 | Iverson | 248/489 X |
| 3,936,913 | 2/1976 | Weissman | 248/317 X |
| 3,952,985 | 4/1976 | Davenport | 248/317 |

Primary Examiner—William H. Schultz
Attorney, Agent, or Firm—Harness, Dickey & Pierce

[57] ABSTRACT

There is disclosed herein a display hanger particularly adapted for use in suspending signs or other displays from various types of ceiling. The hanger comprises a spade member adapted to be secured to a suitable location to the ceiling and a removable pin member from which the display may be suspended. In one embodiment the spade includes a threaded projection adapted to be threaded into a portion of the ceiling. In other embodiments, the spade may be secured to a plate having an adhesive coating provided thereon or alternatively the spade may be secured to a clip for attachment to support members of suspended ceilings. An installation tool and method of installation is also disclosed herein.

8 Claims, 8 Drawing Figures

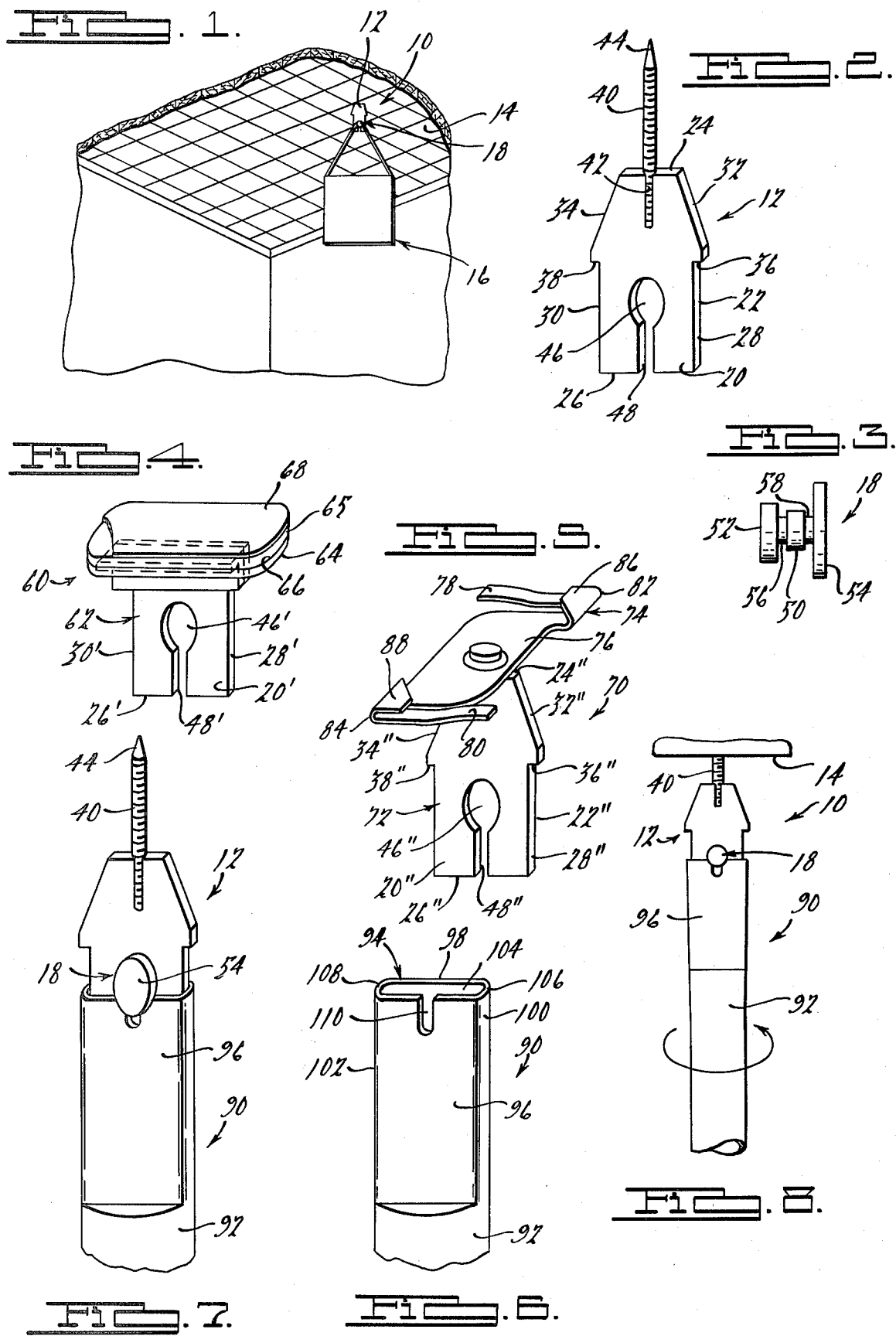

DISPLAY HANGER AND METHOD OF INSTALLATION THEREFOR

BACKGROUND AND SUMMARY OF THE INVENTION

The present invention relates generally to display hanger devices and more particularly to display hangers which are adapted to be secured to a variety of ceiling structures so as to enable a suitable display to be suspended therefrom.

It is often desirable to be able to suspend displays such as signs, advertising materials or the like from the ceilings of business establishments so as to attract the attention of consumers to particular products. In many cases, the supplier of the product to be advertised by the display will supply both the display materials to the business establishment along with means for suspending same from a ceiling or the like. Accordingly, it is desirable for the supplier providing the display and suspension means to be able to limit the use of the suspension means to displays for his product. In order to attach the suspension means to the ceiling it was generally necessary for the owner or manager of the establishment to procure a ladder or other suitable means so as to gain sufficient height to reach the ceiling. Maneuvering ladders or the like around counters, shelves, and other floor level displays is a difficult task and may deter the proprietor from utilizing the display. Also, there is the possibility that the individual may fall from the ladder while installing the display resulting in injury to himself and other floor level displays. Further, because of the various types of ceiling constructions encountered it was necessary for either the supplier of the display or the business proprietor to procure a variety of screws, wire, and other suitable anchoring means.

Accordingly, the present invention overcomes these disadvantages in providing a display hanger which may easily be installed in a variety of ceiling constructions from floor level thereby eliminating the need for ladders or the like. Further, the display hanger of the present invention may be provided with a variety of ceiling attachment means which enable it to be secured to practically any type of ceiling construction ranging from plaster or wall board to suspended ceilings. Also, as the display hanger of the present invention requires the use of a removable pin member from which the display is directly suspended, competitors are effectively discouraged from utilizing the hanger for advertising their own products.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a portion of a building interior illustrating the present invention installed in operative relationship to the ceiling and having a display suspended therefrom;

FIG. 2 is an enlarged perspective view of the hanger illustrated in FIG. 1;

FIG. 3 is an enlarged elevational view of a removable pin for use with the hanger in accordance with the present invention;

FIG. 4 is a perspective view of another embodiment of a hanger in accordance with the present invention;

FIG. 5 is a perspective view similar to that of FIG. 4 but illustrating yet another embodiment of the present invention;

FIG. 6 is a perspective view of a portion of an installation tool for use in installing the display hanger of FIGS. 2, 4 or 5 in accordance with the present invention;

FIG. 7 is a perspective view showing a display hanger and removable pin member associated to the installation tool in preparation for attachment to a ceiling; and FIG. 8 is an elevational view of a display hanger being installed in a ceiling.

DESCRIPTION OF THE PREFERRED EMBODIMENTS

Referring now to the drawings and in particular to FIGS. 1 through 3, there is shown a display hanger assembly generally indicated at 10 and comprising a hanger member 12 secured to ceiling 14 and a display 16 suspended from a removable pin member 18 operatively associated with hanger member 12.

As best seen with reference to FIG. 2, hanger member 12 has a rather irregular shape substantially as shown including front and back surfaces 20 and 22, substantially parallel upper and lower sidewalls 24, 26, a pair of generally vertically extending spaced sidewalls 28, 30, extending upward from lower sidewall 26, slightly inclined diverging spaced sidewalls 32 and 34 extending downward from upper sidewall 24 and step portions 36 and 38 interconnecting respective inclined sidewalls 32 and 34 with upwardly extending sidewalls 28 and 30. A threaded attachment member 40 is secured within a slot 42 extending inward from upper sidewall 24. Threaded attachment member 40 may be easily secured to hanger member 12 by welding, brazing, soldering by use of a suitable adhesive or in any other suitable manner. Alternatively, threaded attachment member 40 may be integrally formed with hanger member 12 if so desired. Threaded attachment member 40 has a generous length and is provided with a relatively sharp pointed outer end portion 44 so as to facilitate installation of hanger member 12 into a portion of ceiling 14 without the need to provide a pilot hole therefor.

Hanger member 12 also has an opening 46 extending therethrough and disposed in the lower center portion of surface 20, which is adapted to receive removable pin member 18. A slot 48 of a width less than the diameter of opening 46 extends from the lower portion of opening 46 to lower sidewall 26. Slot 48 operates to prevent the use of the installed hanger member without removable pin member 18 thereby reducing the likelihood of a competitor displaying advertising materials from the hanger assembly during periods of non-use by the supplier thereof.

Referring now to FIG. 3, removable pin member 18 is illustrated and comprises a generally elongated cylindrical shank portion 50 having enlarged diameter end portions 52 and 54. End portion 52 has a smaller diameter than end portion 54 and is sized so as to enable it to be inserted through opening 46 of hanger member 12. End portion 54, being of a larger diameter than opening 46, will prevent pin member 18 from passing completely therethrough.

Shank portion 50 also has a pair of reduced diameter annular grooves 56 and 58 provided thereon immediately adjacent respective end portions 52 and 54, groove 58 having a slightly smaller diameter than groove 56.

Groove 58 is designed to cooperate with an installation tool described below so as to allow removable pin 18 to be installed in or removed from hanger member 12 without the need for a ladder or the like. Groove 56 is designed to receive a wire, line or clip to which the display material may be attached subsequent to assembly of the pin member 18 to the hanger member 12.

While threaded attachment member 40 is particularly well suited for attachment of hanger member 12 to a wooden portion of a ceiling such as a beam or a plaster surface, in some cases it may be desirable to avoid making a hole in the ceiling or the ceiling construction may not be suitable for engagement by a threaded member. Accordingly, another embodiment of the present invention is illustrated in FIG. 4 indicated generally at 60 and comprising a hanger member 62 having a plate member 64 secured to the upper surface thereof. A suitable adhesive layer 65 is provided on upper surface 66 of plate 64 which may be covered with a suitable protective release paper covering or the like 68. Thus, in order to install hanger member 62, paper covering 68 need merely be removed and plate 64 pressed firmly against the appropriate portion of the ceiling. Adhesive layer 65 as shown is in the form of a resilient pad or cushion having layers of adhesive on both upper and lower surfaces thereof, the lower surface being operative to secure adhesive layer 65 to surface 66. The resilient pad enables the hanger to be secured to textured or otherwise slightly irregular surfaces by deflecting so as to conform to the surface to which the hanger is to be secured. Hanger member 62 is otherwise substantially the same in construction and operation as described above with reference to hanger member 12 and accordingly corresponding portions thereof are indicated by like numerals primed.

As many business establishments now utilize what are commonly referred to as suspended ceilings comprising a grid work of inverted general T-shaped members which support a plurality of relatively lightweight, relatively thin and often flexible panels, it is desirable to provide a hanger specifically adapted for use therewith. Accordingly, such an embodiment is indicated generally at 70 in FIG. 5 comprising a hanger member 72 secured to an attachment clip 74. Attachment clip 74 is similar to that disclosed in U.S. Pat. No. 3,003,735, the disclosure of which is hereby incorporated by reference, and comprises a base portion 76, a pair of spring arms 78 and 80 integrally formed therewith and extending in substantially parallel spaced relationship to opposite lateral edges of base portion 76 and from diagonally opposed corners 82 and 84 thereof and a pair of relatively small overlying flange portions 86 and 88. Attachment clip 74 is designed to grip a lower flange portion of the supporting inverted T-shaped members and may be easily installed by merely positioning surface 89 of base portion 76 against the lower surface of the T-member with the terminal ends of spring arms 78 and 80 approximately aligned with the longitudinal axis thereof and then rotating the clip through a few degrees to bring overlying flange portions 86 and 88 into engagement and supporting relationship with the upper surfaces thereof. Hanger member 72 may be either rigidly secured to clip 74 in any suitable manner or alternatively may be secured to a depending pin member as shown which depending pin member may be rotatable with respect to base portion 76 if desired. This enables the display to be "aimed" in any desired direction. As hanger member 72 is substantially the same as hanger member 12, like portions thereof have been indicated by like numerals double primed.

Referring now to FIGS. 6 through 8, a method and tool for installing the display hanger of the present invention is illustrated and will be described. An installation tool 90 is provided comprising an elongated generally cylindrical hangle portion 92 of sufficient length to enable a person standing at floor level to easily reach the ceiling. Tool 90 has a hollow end portion 94 defined by substantially parallel spaced sidewalls 96 and 98 interconnected by arcuate shaped end walls 100, 102. A generally oblong shaped opening 104 is provided in end portion 94 extending inwardly and is adapted to receive hanger member 12 therein. As shown, slot 104 has a major width dimension selected such that stepped portions 36 and 38 of hanger member 12 will engage opposite edge portions 106 and 108 of end walls 100, 102 respectively thereof thereby enabling upwardly directed pressure to be applied to attach the hanger member 12 to the ceiling.

Tool 90 also has a relatively short slot 110 provided in surface 96 thereof opening out end portion 94 which slot is adapted to receive removable pin member 18. Slot 110 has a width approximately equal to the diameter of reduced diameter portion 58 of removable pin member 18. Thus, once hanger member 12 has been attached to the ceiling, removable pin member 18 may then be placed in slot 110 with end portion 52 extending outward from surface 96 thereof. End portion 52 may then be inserted through opening 46 of hanger member 12 and installation tool 90 removed therefrom. The display hanger is now ready to have a suitable display attached to removable pin member 18 by merely slipping the suspension line or wire attached thereto over end portion 52 thereof and into groove 56. The enlarged diameter end portion 54 of removable pin member 18 will prevent pin member 18 from slipping through opening 46 of hanger member 12 while the display suspension line or wire will prevent end portion 52 from passing through opening 46.

Once the display has served its purpose, it may easily be removed along with removable pin member 18 thereby effectively preventing use of the display hanger by a competitor in the interim until it is desired to suspend a new display therefrom.

As is therefore apparent, the present invention provides an extremely economical display hanger which is adapted for use with substantially any type of ceiling construction and which can easily and rapidly be installed by an individual standing at floor level thereby eliminating the need to position a ladder or the like. Further, as the display hanger assembly of the present invention utilizes a removable pin member from which the desired display is suspended, the hanger may be left attached to the ceiling during periods of non-use without concern for unauthorized use thereof.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A display hanger assembly comprising:
a hanger member having an opening therein;

attachment means secured to said hanger member and adapted to enable said hanger member to be secured to a portion of a building structure;

a removable pin member receivable within said opening and having a shank portion and opposite enlarged diameter end portions, said removable pin member supportingly engaging portions of said hanger member so as to enable a display to be suspended from said pin member.

2. A display hanger assembly as set forth in claim 1 wherein said opening includes a slot extending from a lower portion of said opening to a lower edge of said hanger member, said slot having a width less than the diameter of said shank portion and being operative to hinder unauthorized use of said display hanger assembly.

3. A display hanger assembly as set forth in claim 1 wherein one of said end portions has a diameter approximately equal to the diameter of said opening and the other of said end portions has a diameter greater than said opening.

4. A display hanger assembly as set forth in claim 1 wherein said attachment means comprises a threaded member having a pointed outer end operative to pierce the surface of said building structure.

5. A display hanger assembly as set forth in claim 1 wherein said attachment means comprises a plate member having a lower surface secured to said hanger member and an adhesive material provided on an upper surface thereof.

6. A display hanger assembly as set forth in claim 1 wherein said attachment means comprises a clip member, said clip member having a body portion and overlying flange portions adapted to wrap around and engage opposite edge portions of a supporting beam.

7. A system for suspending a display from a portion of a building structure comprising:

a hanger member having an opening extending therethrough and a slot extending between a lower edge thereof and said opening and stop means provided along lateral edges of said hanger member;

attachment means secured to an upper edge of said hanger member, said attachment means being operative to enable said hanger member to be secured to a portion of a building structure;

an installation tool having an elongated handle portion and a hollow end portion having a cross sectional shape substantially the same as said hanger member whereby said hanger member may be received within said end portion with said stop means engaging sidewalls of said end portion whereby said installation is operative to secure said attachment means to said portion of a building from floor level of said building;

a removable pin member receivable within said opening, said removable pin member being operative to enable a display to be suspended from said hanger member, said installation tool further having a slot provided therein, said pin member being receivable within said slot whereby said pin member may be assembled to said hanger member from said floor level subsequent to securing said attachment means to said portion of said building.

8. A display hanger assembly as set forth in claim 7 wherein one of said end portions has a diameter approximately equal to the diameter of said opening and the other of said end portions has a diameter greater than said opening.

* * * * *